United States Patent [19]
Manasson et al.

[11] Patent Number: 5,694,498
[45] Date of Patent: Dec. 2, 1997

[54] OPTICALLY CONTROLLED PHASE SHIFTER AND PHASED ARRAY ANTENNA FOR USE THEREWITH

[75] Inventors: Vladimir Manasson, Los Angeles; Lev S. Sadovnik, Irvine, both of Calif.

[73] Assignee: WaveBand Corporation, Torrance, Calif.

[21] Appl. No.: 699,012

[22] Filed: Aug. 16, 1996

[51] Int. Cl.$^6$ .............................. G02B 6/28; G02F 1/295
[52] U.S. Cl. .................................. 385/15; 385/3; 385/5; 385/14; 385/49; 343/700 MS; 343/853; 342/200; 342/368
[58] Field of Search ........................... 385/1, 3, 5–9, 385/14, 15, 27, 30, 31, 42, 49, 50; 342/200, 368; 343/762, 772, 777, 778, 700 MS, 853; 359/183, 188, 279

[56] References Cited

U.S. PATENT DOCUMENTS

| | | | |
|---|---|---|---|
| 4,739,334 | 4/1988 | Soref | 342/368 |
| 5,133,027 | 7/1992 | Funazaki et al. | 385/5 |
| 5,222,162 | 6/1993 | Yap et al. | 385/14 |
| 5,315,422 | 5/1994 | Utaka et al. | 385/5 |
| 5,333,000 | 7/1994 | Hietala et al. | 342/368 |

OTHER PUBLICATIONS

Phase Shift and Loss Mechanism of Optically Excited E-plane Electron-Hole Plasma, Ao Sheng Rong and Zhong Liang Sun; Dept. of Radio Engineering, Southeast University, pp. 543–544, 1993.

Theory of Optically Controlled Millimeter-Wave Phase Shifters, Aileen M. Vaucher, Cahrles D. Striffler, Chi H. Lee; IEEE, Transactions on Microwave Theory and Techniques 1983, pp. 209–216.

Optically Controllable Millimeter Wave Phase Shifter; A.P. DeFonzo, Chi H. Lee, P.S. Mak; American Institute of Physics (1979); pp. 575–577.

Optical Control of Millimeter-Wave Propagation in Dielectric Waveguides, Chi H. Lee, Paul S. Mak, and A.P. DeFonzo; IEEE Journal of Quantum Electronics, vol. QE–16, No. 3, Mar. 1980. pp. 277–288.

Nonumiform Layer Model of a Millimeter-Wave Phase Shifter; Jerome K. Butler, Tran-Fu Wu, Marion W. Scott; IEEE Transactions on Microwave Theory and Techniques, vol. MTT–34, No. 1, Jan. 1986.

*Primary Examiner*—Rodney B. Bovernick
*Assistant Examiner*—Hemang Sanghavi
*Attorney, Agent, or Firm*—Nilles & Nilles, S.C.

[57] ABSTRACT

Systems and methods for optically controlled phase shifters are described. An apparatus includes a proximal rib waveguide; a phase shifter connected to the proximal rib waveguide, the phase shifter including: a first plasma induced modulator connected to the proximal rib waveguide, the first plasma induced modulator having a first transmission coefficient a and including: a first branch waveguide connected to the proximal rib waveguide; and a first photosensitive semiconductive plasma injector connected to the first branch waveguide; a second plasma induced modulator connected to the proximal rib waveguide, the second plasma induced modulator having a second transmission coefficient b and including: a second branch waveguide connected to the proximal rib waveguide; and a second photosensitive semiconductive plasma injector connected to the second branch waveguide; and a third plasma induced modulator connected to the proximal rib waveguide, the third plasma induced modulator having a third transmission coefficient c and including: a third branch waveguide connected to the proximal rib waveguide; and a third photosensitive semiconductive plasma injector connected to the third branch waveguide. The transmission coefficients a, b and c are each $\leq 1$. The systems and methods provide a substantial improvement in that a phased array antenna can be steered with the optically controlled phase shifters using much less controlling energy.

24 Claims, 13 Drawing Sheets

OPTICALLY CONTROLLED PHASE SHIFTER AND PHASED ARRAY ANTENNA FOR USE THEREWITH

This application refers to Disclosure Document identification number 371165, which was filed under the Disclosure Document Program at the U.S. Patent and Trademark Office on Feb. 27, 1995, the entire contents of which are hereby expressly incorporated by reference into the present application.

BACKGROUND OF THE INVENTION

1. Field of the Invention

The present invention relates in general to the field of phase shifters. More particularly, the present invention relates to an optically controlled phase shifter and phased array antenna architectures that incorporate the phase shifter. Specifically, a preferred embodiment of the present invention relates to a three arm interferometer phase shifter whose operation is based on interaction between (i) electromagnetic waves in the arms and (ii) an Im($\epsilon$) part of the dielectric constant of semiconductors that are adjacent the arms. The Im($\epsilon$) part of the dielectric constant of the semiconductors is a function of infrared light activated electron-hole plasmas that are injected into the semiconductors. The present invention thus relates to optically controlled phase shifters of the type that can be termed interferometric.

2. Discussion of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

One of the most highly developed approaches to nonmechanical scanning of microwave radar beams is the phased array antenna. Historically, phased array radar beams have been steered by frequency scanning, beam switching and phase scanning with phase shifters. Of these three methods, phase scanning, which utilizes electronically variable phase-shifters and time-delay devices is the most popular.

The larger the dimensions of the phased array antenna aperture, the narrower the beamwidth. A typical prior art planar array for a phased army antenna may include from $10^3$ to $10^4$ antenna elements, with one phase-shifter for each antenna element. The phase-shifters enable the beam to be scanned both in azimuth and in elevation. Although phased arrays can be designed to conform to a specific surface of the platform carrying the antenna, the greatest drawbacks of existing phased array antennas are their high cost and packaging problems, especially at shorter millimeter wave (MMW) wavelengths.

The principle of phase scanning can be illustrated by considering a 1-dimension linear array of antenna elements with a phase-shifter connected to each antenna element, as shown in FIG. 1(a). The beampointing direction is always perpendicular to the wavefront. By introducing an $n\Delta\psi$ phase-shift in the n-th radiating element, the wavefront can be rotated, thereby rotating the millimeter wave (MMW) beam to an angle $\theta$, which is related to $\Delta\psi$ by the formula $$\Delta\Psi = 2\pi a \sin\theta/\lambda,$$

where a is the inter-element spacing and $\lambda$ is the MMW wavelength.

There are a number of possible array configurations.[38] FIG. 1(b) illustrates an end feed array. FIG. 1(c) illustrates a center feed array. FIG. 1(d) illustrates a center feed array with separately optimized sum and difference channels. FIG. 1(e) illustrates an equal path length feed array. FIG. 1(f) illustrates a series phase shifter array. FIG. 1(g) illustrates a matched corporate feed array. FIG. 1(h) illustrates a reactive corporate feed army. FIG. 1(i) illustrates a stripline reactive feed array. FIG. 1(j) illustrates a multiple reactive power divider.

The key element of such phased arrays is the phase shifter. Two common approaches to phase shifting employ PIN diode-based devices and ferrite phase shifters.[1] PIN diodes cannot operate at high frequency because of their high insertion losses. Ferrite phase shifters require high control power, and are bulky, heavy, and expensive.

Although the optical control of phase shifters has great potential for lowering the cost and simplifying the packaging of MMW scanning antennas, optical control of phased arrays has previously been inefficient. Light-controlled phase shifters in which a phase shift is induced by varying the "real" part of the dielectric constant of the semiconductor material have been previously described.[2-6] However, a recognized disadvantage of such prior art light-controlled phase shifters is that they require very high light pumping power. Consequently, the prior art light-controlled phase shifters have not been employed in practical systems. To illustrate the problems encountered by this approach, it is useful to consider the phase shift and losses that are conventionally introduced by a non-equilibrium electron hole plasma.

Referring to FIG. 3, a noticeable phase shift $\Delta\phi$ occurs when plasma density P is greater than $3\times10^{17}$ cm$^{-3}$. At this level of photo-injection, the loss reaches a maximum and practically stops MMW propagation. At higher pumping levels the electron-hole plasma degenerates and behaves as in a metal. At these higher pumping levels ($P \geq 10^{20}$ cm$^{-3}$) the plasma has a low loss and induces the highest phase shift. However, the problem is that an unacceptably high pumping energy is required to reach these higher pumping levels. For example, to reach $P=10^{20}$ cm$^{-3}$ silicon needs to be illuminated with a pulse whose energy is as high as 20 $\phi$/cm$^2$. This is so even in the ideal case, which assumes an unrealistic quantum efficiency of 100%. This unacceptably high pumping energy requirement is the greatest obstacle to practical application of the prior art photosensitive phase shifters.

SUMMARY AND OBJECTS OF THE INVENTION

By way of summary, the present invention is directed to an optically controlled three arm interferometer phase shifter. The invention is based on changes in the mathematically "imaginary" Im($\epsilon$) part of the dielectric constant of semiconductor mediums that are located near each of the three interferometer arms. The changes in the Im($\epsilon$) part of the dielectric constant of the semiconductor mediums can advantageously be imposed by photo-induced electron-hole plasmas. For example, such photo-induced electron-hole plasmas can be formed in a silicon modulator by exposing the silicon to an infrared electromagnetic field. By providing a phase shifter, wherein a MMW signal has been divided into three parallel optical waveguides of different optical path lengths, with three such silicon modulators, the divided signals can be individually attenuated. The attenuation is carried out by coupling energy from the divided signals into the photo-induced electron-hole plasmas in the silicon modulators. The individually coupled energies are dissipated into the silicon modulators as ohmic heat. The three divided and attenuated signals are then recombined into a single phase shifted signal. An unexpected result of the present invention, which is a substantial improvement, is to permit the construction and operation of an optically controlled phased array antenna which requires far less energy to operate and control.

A primary object of the invention is to provide a method that can be used to phase shift an electromagnetic signal and steer an phased array antenna beam. It is another object of the invention is to provide a method that is predictable and reproducible, thereby decreasing variance and operating costs. It is yet another object of the invention is to provide a method that has one or more of the characteristics discussed above but which is which is relatively simple to set-up and tone using moderately skilled workers.

In accordance with this first aspect of the invention, these objects are achieved by providing a method comprising providing a proximal rib waveguide; providing a phase shifter connected to said proximal rib waveguide, sad phase shifter including: a first plasma induced modulator connected to said proximal rib waveguide, said first plasma induced modulator having a first transmission coefficient a, where $a \leq 1$, and including: a first branch waveguide connected to said proximal rib waveguide; and a first photosensitive semiconductive plasma injector connected to said first branch waveguide; a second plasma induced modulator connected to said proximal rib waveguide, said second plasma induced modulator having a second transmission coefficient b, where $b \leq 1$, and including: a second branch waveguide connected to said proximal rib waveguide; and a second photosensitive semiconductive plasma injector connected to said second branch waveguide; and a third plasma induced modulator connected to said proximal rib waveguide, said third plasma induced modulator having a third transmission coefficient c, where $c \leq 1$, and including: a third branch waveguide connected to said proximal rib waveguide; and a third photosensitive semiconductive plasma injector connected to said third branch waveguide; applying an electromagnetic signal to said proximal rib waveguide; applying a first infrared signal to said first photosensitive semiconductive plasma injector through a first optical fiber; applying a second infrared signal to said second photosensitive semiconductive plasma injector through a second optical fiber; and applying a third infrared signal to said third photosensitive semiconductive plasma injector through a third optical fiber. In one embodiment, said electromagnetic signal includes a MMW signal and an output signal amplitude $I_{out}$ from said output waveguide varies as a function of an input signal amplitude $I_o$ to said proximal rib waveguide according to a relationship $I_{out}(a, b, c) = aI_o/3 + (bI_o/3)\exp(2\pi i/3) + (cI_o/3)\exp(-2\pi i/3)$, where $aI_o/3$ represents a first branch signal amplitude, $(bI_o/3)\exp(2\pi i/3)$ represents a second branch signal amplitude and $(cI_o/3)\exp(-2\pi i/3)$ represents a third branch signal amplitude. Of course, the invention also includes reversing the above-discussed path of the electromagnetic signal so as to operate a receiving antenna.

Another object of the invention is to provide a fiber optic system to deliver optical control signals to the photosensitive elements of an optically controlled three arm interferometer phase shifter. Another object of the invention is to provide a phased array antenna that is cost effective. It is another object of the invention to provide a phased array antenna that is rugged and reliable, thereby decreasing down time and operating costs. It is yet another object of the invention to provide a phased array antenna that has one or more of the characteristics discussed above but which is relatively simple to manufacture and assemble using a minimum of equipment.

In accordance with this second aspect of the invention, these objects are achieved by providing an apparatus comprising: a first phased array including a first bus waveguide and a first plurality, of phase shifters, each of said first plurality of phase shifters i) being connected to said first bus waveguide with a proximal rib waveguide and ii) including, a first plasma induced modulator connected to said proximal rib waveguide, said first plasma induced modulator having a first transmission coefficient a and including: a first branch waveguide connected to said proximal rib waveguide; and a first photosensitive semiconductive plasma injector connected to said first branch waveguide; a second plasma induced modulator connected to said proximal rib waveguide, said second plasma induced modulator having a second transmission coefficient b and including: a second branch waveguide connected to said proximal rib waveguide; and a second photosensitive semiconductive plasma injector connected to said second branch waveguide; and a third plasma induced modulator connected to said proximal rib waveguide, said third plasma induced modulator having a third transmission coefficient c and including: a third branch waveguide connected to said proximal rib waveguide; and a third photosensitive semiconductive plasma injector connected to said third branch waveguide, wherein a, b and c are each $\leq 1$. In one embodiment, the apparatus further comprises a second phased array connected to said first phased array with a trunk waveguide, wherein said first phased array includes a first end feed array and said second phased array includes a second end feed array.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

DESCRIPTION OF PREFERRED EMBODIMENTS

Figure 1A:
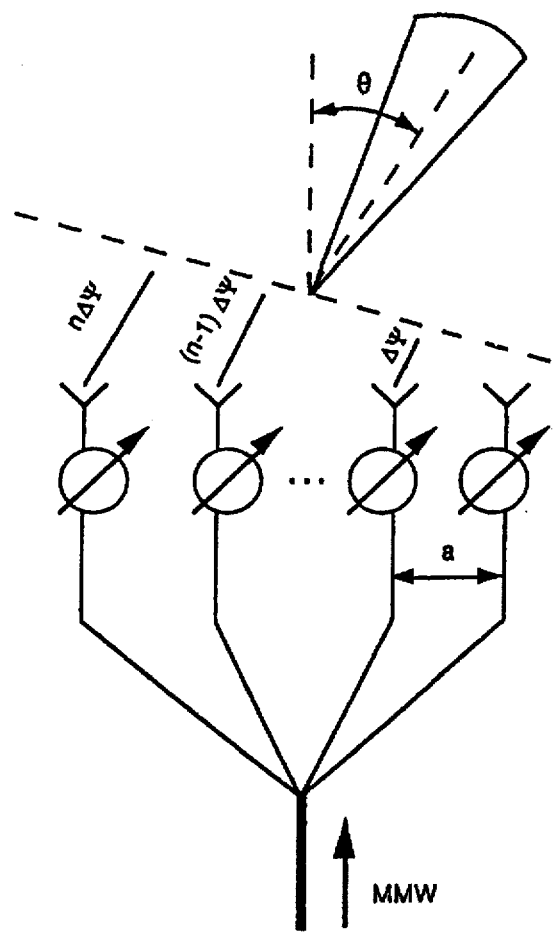
FIGS. 1(a)–1(j) illustrate schematic diagrams of conventional phased arrays, appropriately labeled "PRIOR ART"
Figure 1B:
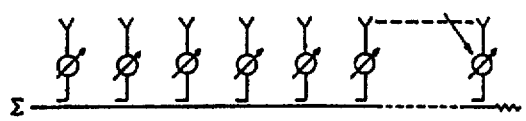
Figure 1C:
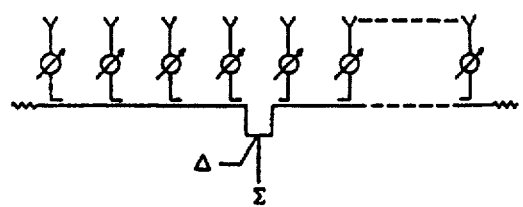
Figure 1D:
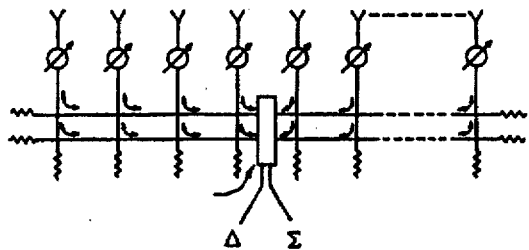
Figure 1E:
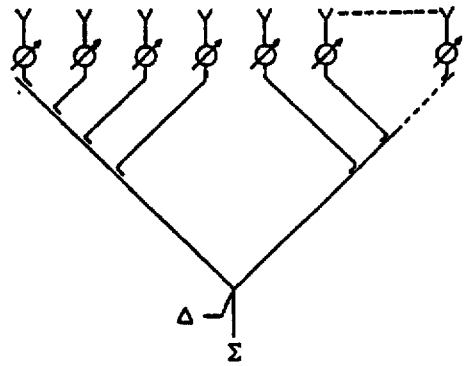
Figure 1F:
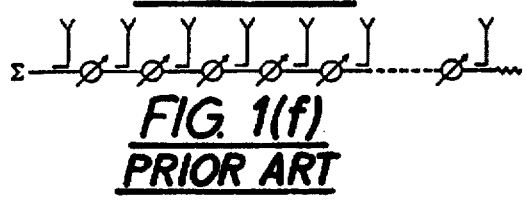
Figure 1G:
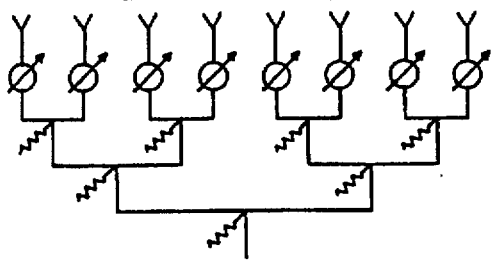
Figure 1H:
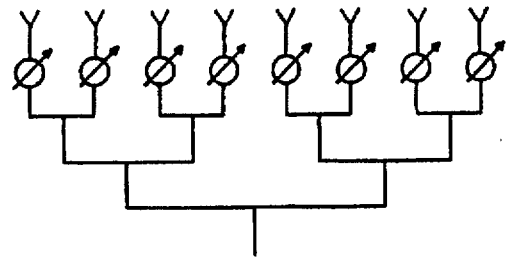
Figure 1I:
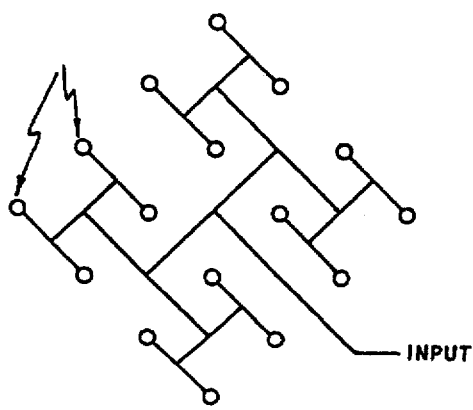
Figure 1J:
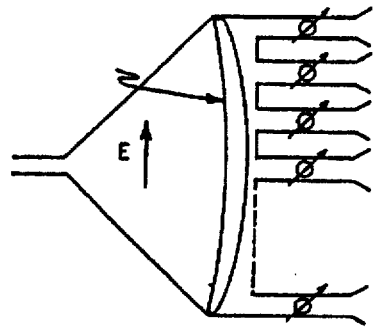

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The above-mentioned requirements and objects are mutually contradicting and cannot be satisfied simultaneously in the case of a conventional optically controlled phase shifter. In the prior art, a photo-injected electron-hole plasma effectively interacts with MMW electromagnetic sights in a waveguide through changes in the "real" part of the dielectric constant of a semiconductor waveguide material. This fact can be expressed with the following notation. The prior art approach utilizes the change in the "real" (i.e., Re (ε)) part of the dielectric constant ε of a semiconductor waveguide material. In the prior art, changes in the "imaginary" (i.e., Im(ε)) part of the dielectric constant ε of a semiconductor waveguide material are parasitic and impose undesirable losses of MMW energy.

However, it is rendered possible to simultaneously satisfy the above-mentioned requirements and objects to a certain extent by employing a phase shifter according to the present invention in consideration of the fact that the phase shifter according to the present invention requires much less pumping power (e.g., by at least 3 orders of magnitude). This is due to the utilization of the Im(ε) portion of the dielectric constant of a semiconductor waveguide material.

An antenna in accordance with the present invention can include MMW power distribution among the radiating elements from a bus dielectric waveguide and semiconductor-on-insulator waveguide phase shifters controlled by light from a fiber optic system. Such an antenna allows 2-D scanning, and thus is preferable for seeker radar applications.

Commercial applications of the present invention include automobile collision avoidance systems, aircraft landing systems, and weather monitoring. Specifically, a recognized application for the present invention is an antenna for seeker radars. More specifically, the present invention can be used as a compact scanning MMW phased array antenna for seeking applications where beam scanning is controlled by light.

2. Detailed Description of Preferred Embodiments

Referring to the drawings, it can be seen that the optically controlled phase shifter is a key element of the antenna system. An optically controlled phase shifter can be a single channel device or a multichannel device. Such a phase shifter can incorporate an integrated amplifier to compensate for the losses and to obtain additional gain. Fiber optic links can be used to control the phase shifters.

The MMW fiber delivery system provides compactness, mechanical flexibility and cost effectiveness in distributing MMW radiation among the channels. Pursuant to the present invention, the features illustrated in the drawings are not necessarily drawn to scale.

Figure 2:
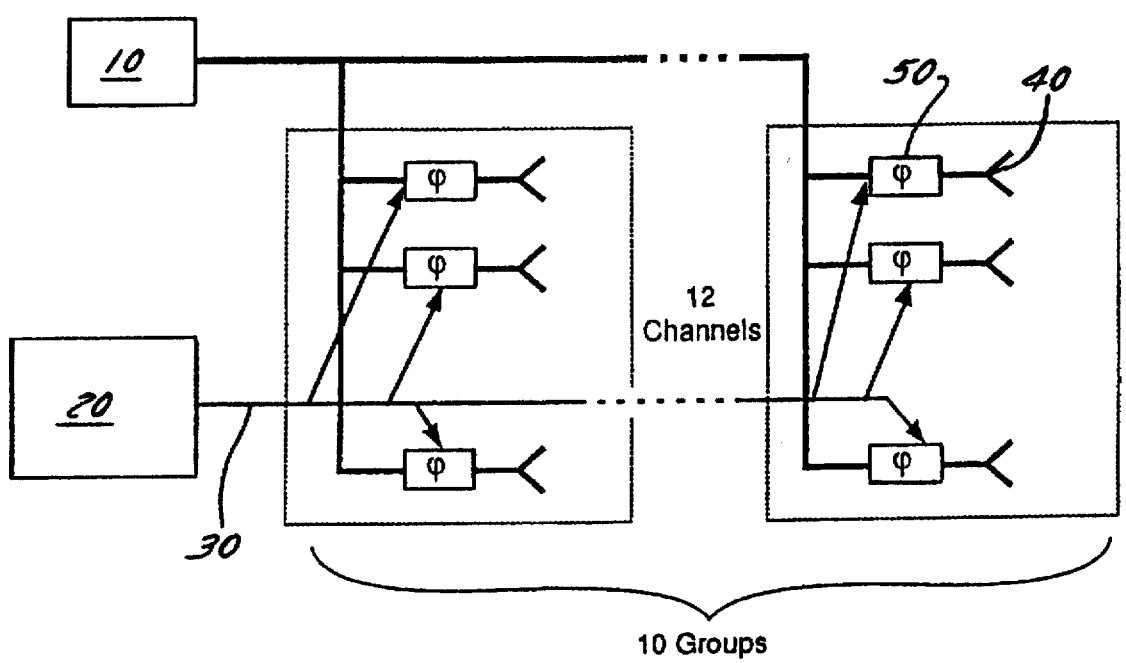
FIG. 2 illustrates a schematic diagram of an antenna system according to the present invention.
Figure 3:
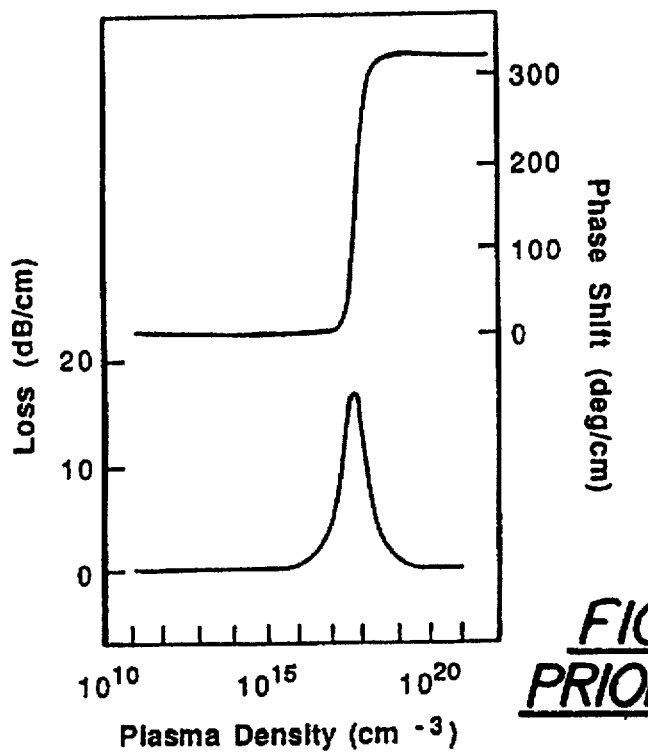
FIG. 3 illustrates phase shift and loss as functions of non-equilibrium electron-hole plasma density in a silicon waveguide at a frequency of 94 GHz, appropriately labeled "PRIOR ART"

This new phase-shifting technology is based on the excitation of an electron-hole plasma in a semiconductor that is adjacent a branch waveguide. A preferred embodiment of this phase-shifting technology is a three-arm interferometer design, whose operation is based on changing the mathematically imaginary part of the dielectric constant of the semiconductor material. A significant unexpected beneficial result of such a phase shifter design is that much less optical control pumping power is required, often by at least 3 orders of magnitude A schematic diagram of an antenna according to the present invention is shown in FIG. 2. The antenna consists of an MMW source 10, an optical control driver 20 and fiber optic signal delivery system 30. As an example, the antenna can include a total of 120 radiating and/or receiving elements 40, in a 10×12 radiating grid. Every radiating and/or receiving element 40 can be fed individually by its own phase shifter 50. Each phase shifter 50 can be individually controlled by signals from the optical control driver 20. The signals from the driver 20 can be delivered by fiber optic signal delivery system 30. The advantage of this approach is the much greater design flexibility. This flexibility offers high potential for the 2-D scanning that is required for seeker applications.

As previously noted, the key element of the new antenna is a phase shifter that is controlled by light. This phase shifter is a three-arm interferometer with photocontrolled amplitude modulator elements in each arm (branch). Throughout this application, the terms arm and branch are used interchangeably. These phase shifters can be integrated into groups and combined with amplifiers to form an antenna of a very large size.

In marked contrast to the prior art approach, the present invention is based on losses imposed by the Im($\epsilon$) part of the dielectric constant of the semiconductor which is a function of the photo-injected plasma. As noted above, previous waveguide geometries require pumping power that is often at least 1000 times higher![6]

As an alternative example, a two-arm dielectric waveguide interferometer containing semiconductor photosensitive elements can be used as a phase shifter. However, the phase shift introduced by a two-arm interferometer is restricted to 180°. Therefore, it is preferred to use a three-arm waveguide interferometer which has 360° phase shifting capability. An example of a three-arm interferometer phase-shifter design is shown in FIG. 4.

Figure 4:
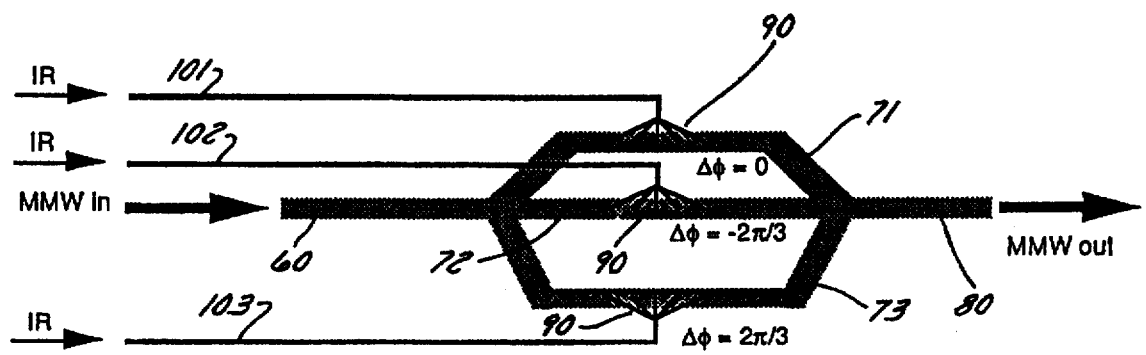
FIG. 4 illustrates a schematic view of a phase-shifter design in accordance with the present invention.

Referring to FIG. 4, millimeter wavelength energy in the form of an electromagnetic signal is applied to proximal rib waveguide 60. Proximal rib waveguide 60 is connected to first branch waveguide 71, second branch waveguide 72 and third branch waveguide 73. First branch 71, second branch 72 and third branch 73 are connected to distal rib waveguide 80. A plasma inducing modulator 90 is connected to each branch waveguide. A first optical fiber 101 is connected to first branch 71. A second optical fiber 102 is connected to second branch 72. A third optical fiber 103 is connected to third branch 73. Control signals are sent to the modulators through the optical fibers.

All three branches (arms) of the interferometer differ in length and/or width. This introduces a specific phase shift in each branch that is distinct from the phase shifts in the other two branches. The ideal design will introduce phase shifts with a difference of $\Delta\phi=\pm 2\pi/3$ among the branches.

Figure 5:
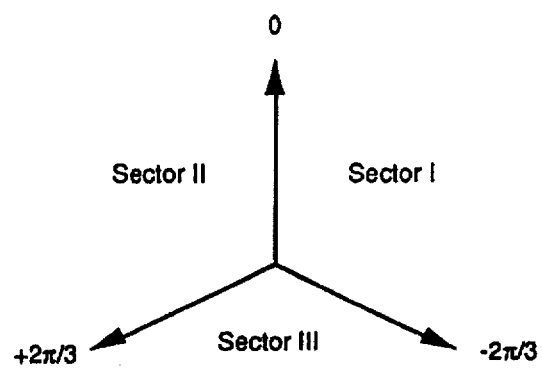
FIG. 5 illustrates basic vectors corresponding to the MMW phase shift generated in the three arms (branch waveguides) of an optically controlled interferometer phase shifter according to the present invention.

Referring to FIG. 5, the angles between the represented vectors are $2\pi/3$. The output signal $I_{out}$ can depend on transmission coefficients a, b and c of the branches (arms), where a,b,c$\leq$1, according to the formula:

$$I_{out}(a,b,c)=aI_o/3+(bI_o/3)\exp(2\pi i/3)+(cI_o/3)\exp(-2\pi i/3)$$

The proper choice of coefficients a, b and c produces an output signal of any desired phase shift $\phi$ with an output intensity that corresponds to the input intensity for any $\phi$. The maximum possible value for I to cover an entire $2\pi$-phase shift is:

$$(1/(2\sqrt{3}))I_0$$

Figure 6:
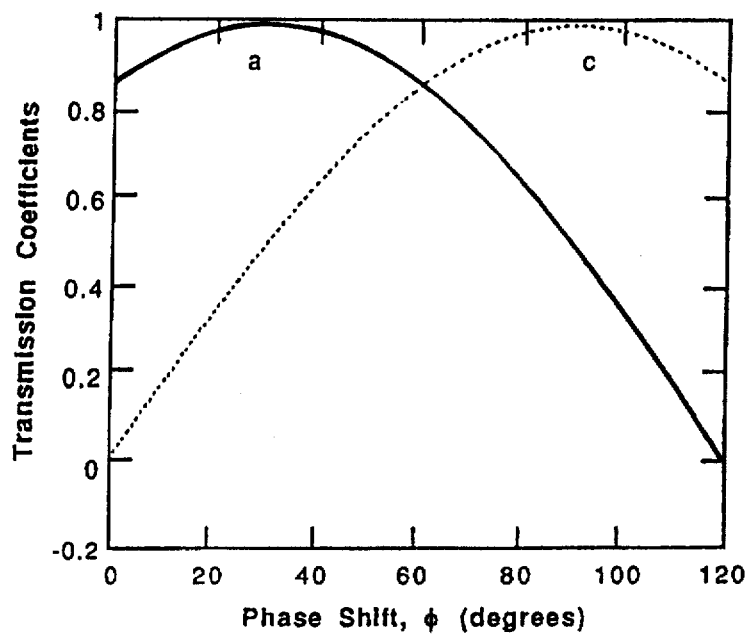
FIG. 6 illustrates that selecting the proper transmission coefficients A and C can produce any phase shift between 0 and −2π/3.

For example, to obtain a shift $I_{out}$ in Sector I (FIG. 5), a transmission coefficient b=0 can be chosen and then coefficients a and c will be as pictured in FIG. 6. It should be noted that the graph show in FIG. 6 is for coefficient b=0 and that b can be chosen to have a value >0. The intensity of the output signal is $$(1/(2\sqrt{3}))I_0 \sim 0.29\,I_0$$

Since there is rotation symmetry, any phase shire can be attained in Sectors II and III in the same manner.

Figure 7:
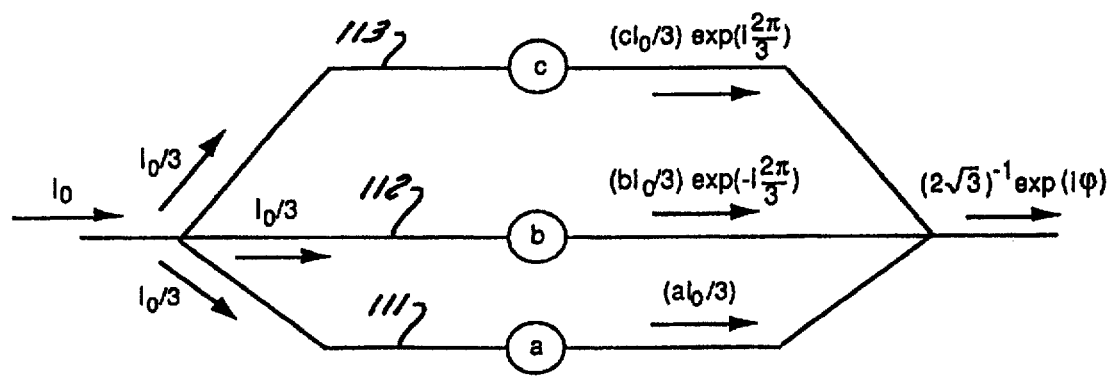
FIG. 7 illustrates a schematic diagram of a 3-arm interferometer phase shifter according to the present invention where the phase shift φ=f(a,b,c)

The schematic diagram of an interferometer phase shifter is shown in FIG. 7. In FIG. 7, the refractive index of first branch 111 is schematically represented by the encircled variable A. The refractive index of second branch 112 is schematically represented by the encircled letter B. Similarly, the refractive index of third branch 113 is schematically represented by the encircled letter C.

Designing, fabricating, and testing the 3-arm-interferometer phase shifter does not require undue experimentation. Designs can be iteratively tested one at a time to optimize the phase shifter and its control. To obtain reproducible results and to establish a basis for an integrated design, a 3-arm single phase shifter can be fabricated on a dielectric substrate. Such a phase shifter can have the "rib waveguide" cross section shown in FIG. 8.

Figure 8:
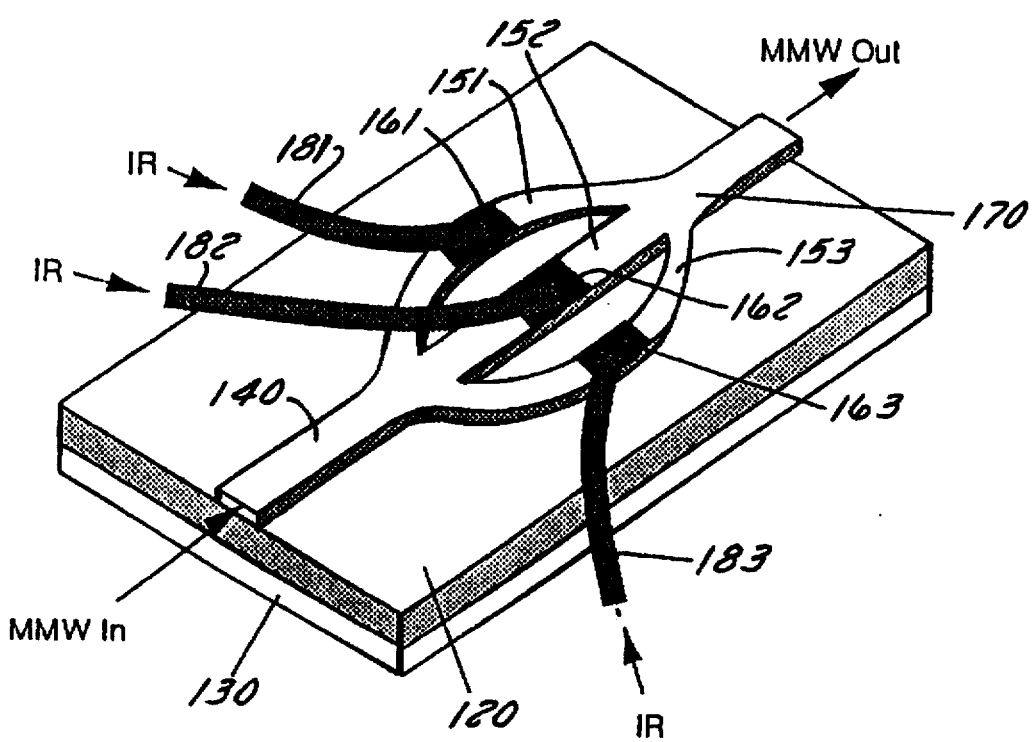
FIG. 8 illustrates a schematic isometric view of a 3-arm interferometer phase shifter according to the present invention.

Referring to FIG. 8, substrate 120 is provided on aluminum plate 130. Millimeter wavelength energy is applied to proximal rib waveguide 140. Proximal rib waveguide 140 is connected to first branch waveguide 151, second branch waveguide 152 and third branch waveguide 153. First branch 151 is provided with first photosensitive semiconductive plasma injector 161. Second branch 152 is provided with a second photosensitive semiconductive plasma injector 162. Third branch 153 is provided with a third photosensitive semiconductive plasma injector 163. The plasma injectors 161, 162, and 163 can be silicon photosensitive elements. The attenuated energy from the branches 151, 152 and 153 is recombined in distal rib waveguide 170. An infrared electromagnetic signal from a light emitting diode is applied to rest photosensitive semiconductive plasma injector 161 through optical fiber 181. An infrared electromagnetic signal is applied to second photosensitive semiconductive plasma injector 162 through optical fiber 182. Similarly, an infrared electromagnetic signal is applied to third photosensitive semiconductive plasma injector 163 through optical fiber 183. Of course, the system can be run in reverse as a receiver.

As a material for the rib and branch waveguides, polytetrafluoroethylene (TEFLON) can be used because of its good tooling characteristics and extremely low losses in the MMW band.[34] Three 0.2 mm quartz fibers can be used to deliver the infrared (IR) radiation to three silicon photosensitive elements from three separately fed infrared LED's. The phase shift range can be varied from 0 to $2\pi$ by changing the current through the LED's.

Figure 9:
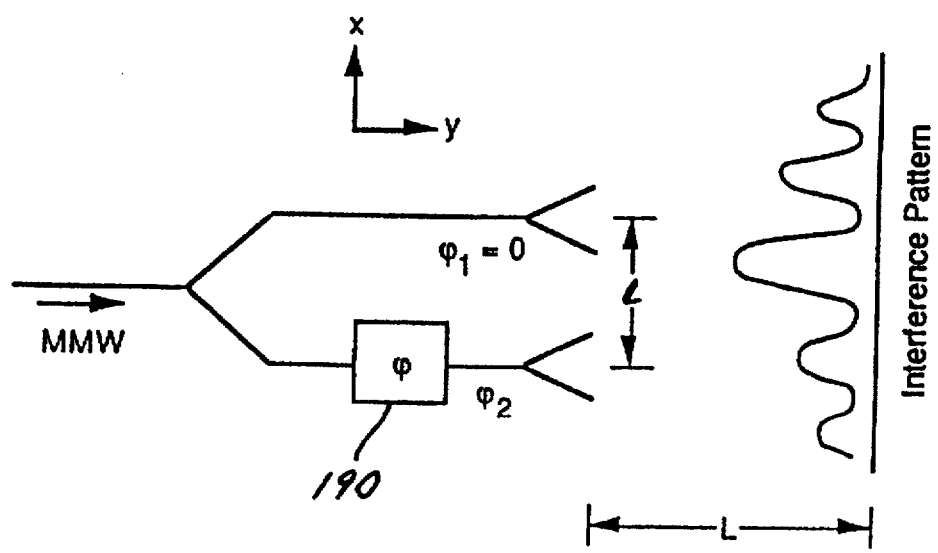
FIG. 9 illustrates a schematic view of a bench-top test set-up where varying φin accordance with the present invention will cause a shift in the interference pattern, which can be diagnostically detected with an MMW probe moving along the x-axis.

While not being limited to any particular diagnostic identifier, preferred embodiments of the phase shifter can be identified one at a time by testing for the presence of accurate phase shifting. The test for the presence of accurate phase shifting can be carried out without undue experimentation by the use of a simple and conventional dual channel experiment. Precise phase shift measurements can be performed without undue experimentation according to the schematic diagram shown in FIG. 9. The MMW signal from the source can be split into two channels, one of which contains the phase shifter 190. Both channels have radiating elements at their free ends. Four parameters determine the interference pattern at the detection plane: the distance l between the radiating elements; the distance L between the radiating elements and the detection plane; the wavelength of the MMW; and the phase shift $\phi_2$ introduced in one of the channels by phase shifter 190. By measuring the lateral displacement in the interference pattern, the phase shift can be determined.

Figure 10:
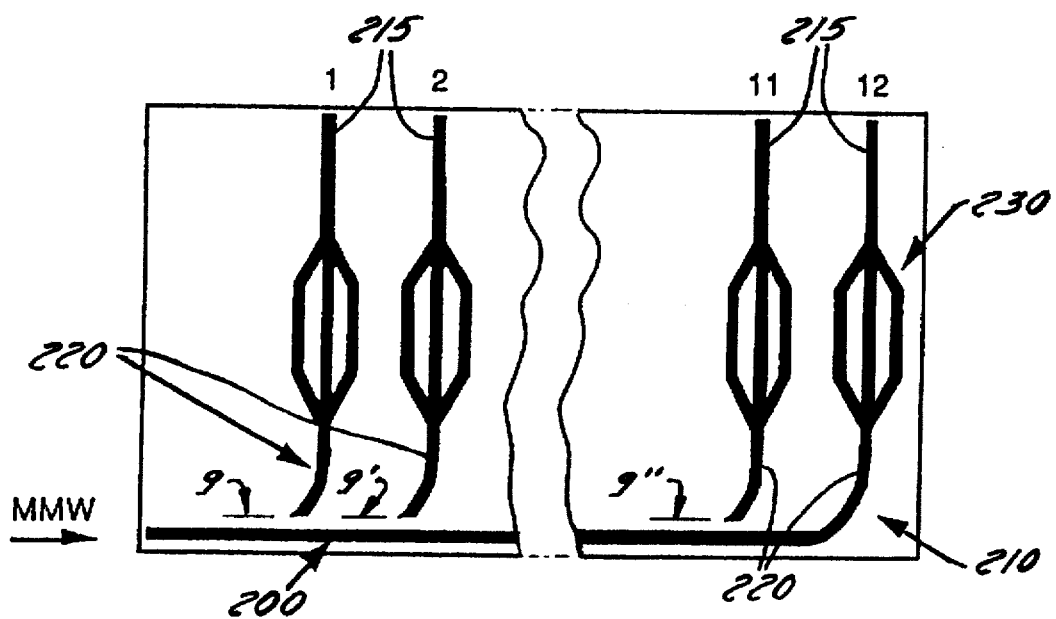
FIG. 10 illustrates a fragmented schematic view of twelve phase shifters (eight of which are not shown) integrated onto a single substrate in accordance with the present invention.

To make an antenna array the phase shifters can be integrated into 10 groups of 12 devices each, as shown schematically in FIG. 10. (Eight of the 12 devices are omitted from FIG. 10 for clarity.) Bus waveguide 200 conducts millimeter wavelength energy along substrate 210. In FIG. 10, four distal rib waveguides 215 are shown connected to bus waveguide 200 through their corresponding proximal rib waveguides 220. Each of the distal rib waveguides 215 is directly connected to a phase shifter 230. Of course, the system can be run in reverse (with regard to the MMW energy) as a receiver.

To split MMW energy among several branches, the coupling approach shown in FIG. 10, where the gap g between the "bus" waveguide and the proximal rib waveguides changes along the bus waveguide to preserve the same coupling power in all proximal rib waveguides can be used. The coupling coefficient between the "bus" waveguide and the proximal rib waveguides can be set for each proximal rib waveguide by controlling the gap width g so as to obtain a uniform distribution of MMW power among the proximal rib waveguides. In the illustrated embodiment, g greater than g' and g' is greater than g".

Three options will now be described for fabricating the integrated substrates. A first option is milling the required waveguide profile into a thick substrate. A second option is etching grooves by photolithography into a thin substrate and then either depositing the dielectric waveguide material into these grooves or attaching previously cut waveguides with adhesive. A third option is molding integrated waveguides. This third option technology is especially attractive for mass production, and can dramatically decrease the cost of the antenna.

However, the particular manufacturing process is not essential to the present invention as long as it provides the described transformation. Normally the manufacturers of this product will select the manufacturing process as a matter of design choice based upon tooling and energy requirements, in view of the expected application requirements of the final product and the demands of the overall manufacturing process.

Figure 11:
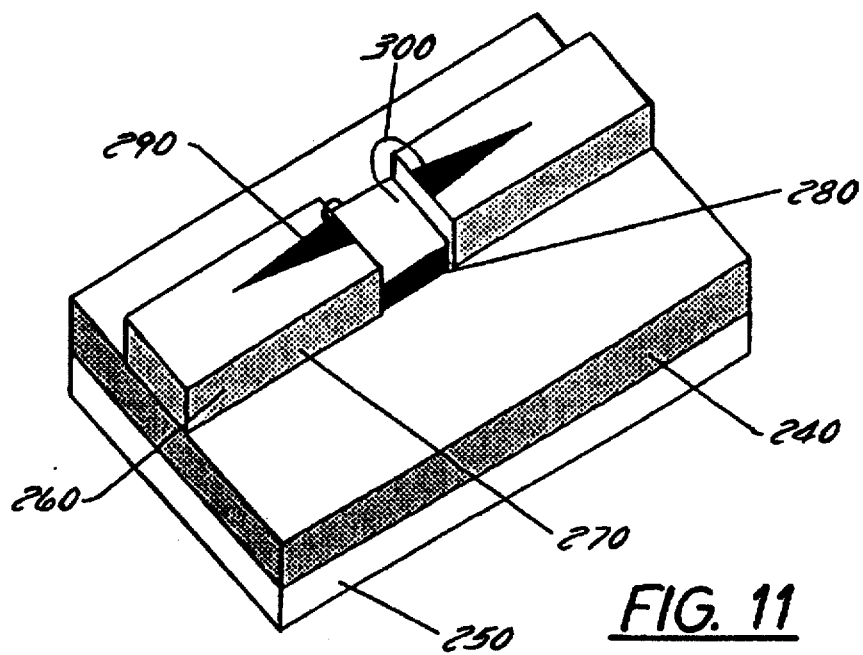
FIG. 11 illustrates a schematic isometric view of a pseudomorphic high electron modality transistor amplifier integrated into a dielectric rib waveguide in accordance with the present invention.

To cover a phase shift from 0 to $2\pi$ with consistent intensity I, output intensity must be less than approximately $0.29 I_o$. Thus, losses of approximately −5.4 dB are the price to be paid for dramatically lowering the controlling power. To compensate for these losses and even to obtain additional gain, it is possible to employ amplifiers integrated into a waveguide, optionally for every integrated phase-shifter group. One such approach is to use millimeter wave amplifiers based on pseudomorphic high electron mobility transistor (PHEMT) devices. PHEMT devices operating at 94 GHz have been demonstrated.[8,9] The PHEMT amplifier (see FIG. 11) can be integrated into the proximal rib waveguide structure. The position of the lower metal electrode of the PHEMT is indicated in FIG. 11. This represents integrating an electronic device into a MMW dielectric waveguide.

Referring to FIG. 11, substrate 240 is provided on aluminum plate 250. Rib waveguide 260 is provided on substrate 240. Rib waveguide 260 includes lower metal electrode 270. PHEMT amplifier chip 280 is connected to upper metal electrodes 290 with wires 300.

MMW waveguides can be used to deliver and distribute MMW power from a MMW source to the integrated phase-shifter groups. Similarly, the same waveguides can be used to collect MMW signal energy for a MMW detector. Two possible delivery and distribution options will now be described. The first option uses a pure dielectric waveguide system. The second option uses a dielectric waveguide covered with a thin metal layer. The thin metal layer of the second option can help to prevent radiation losses and interference among the channels. There are numerous candidate cross sections for the MMW waveguides, six of which are shown in FIGS. 12(a)–12(f).

Figure 12A:
FIGS. 12(a)–12(f) illustrate schematic cross sectional views of a plurality of embodiments of waveguides for a MMW delivery system according to the present invention.
Figure 12B:
Figure 12C:
Figure 12D:
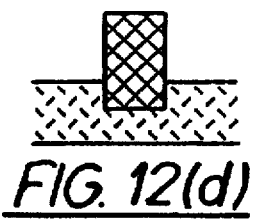
Figure 12E:
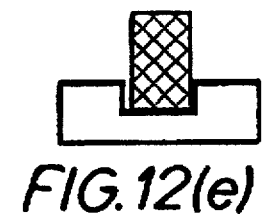
Figure 12F:

Referring to FIGS. 12(a)–12(c), the fiber-like waveguide embodiments include: 12(a) rectangular dielectric, 12(b) circular dielectric, and 12(c) circular metal with dielectric core. Referring to FIGS. 12(d)–12(f), rib waveguide embodiments on dielectric substrates include: 12(d) dielectric composite, 12(e) dielectric-metal, and 12(f) dielectric monolith. In order to evaluate several candidate structures without undue experimentation, different parts of a single antenna can have different fiber structures.

An important aspect of the system is the coupling between sections of the waveguide. Coupling results are best when the ends of both waveguides are tapered and enclosed in a metal sleeve with small horns at both ends as shown in FIG. 13.

Figure 13:
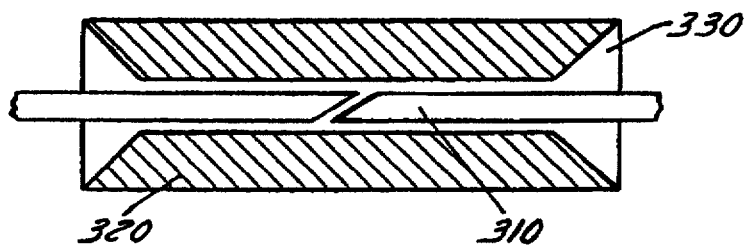
FIG. 13 illustrates a schematic cross sectional view of a coupling between two cylindrical dielectric waveguides obtained by using a horn-end metal sleeve according to the present invention.

Referring to FIG. 13, a waveguide with tapered end 310 of a MMW waveguide is inserted into metal sleeve 320. Another MMW waveguide having a tapered end is similarly inserted from the other end of the metal sleeve 320. Each end of the metal sleeve 320 includes a horn shaped recess 330.

Figure 14:
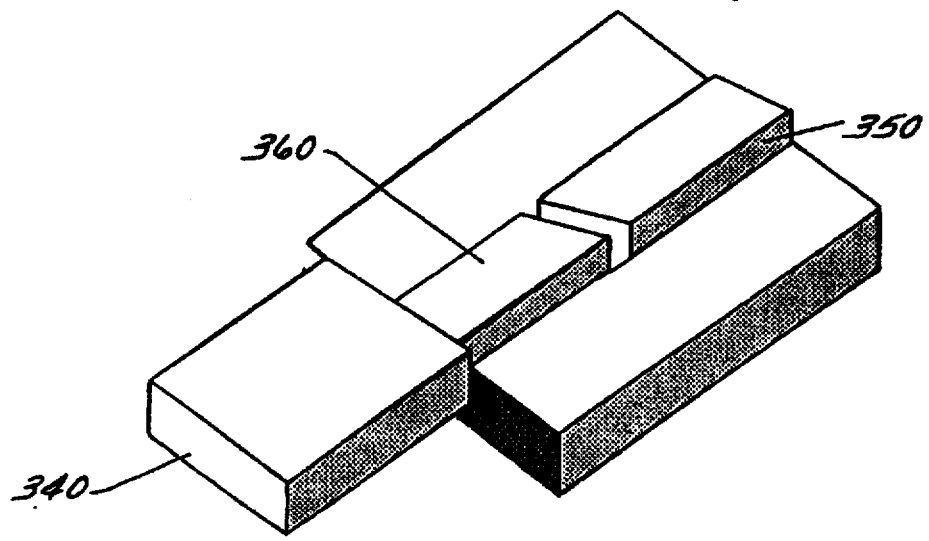
FIG. 14 illustrates a schematic isometric view of a coupling between a rectangular bus waveguide and a rib waveguide according to the present invention.

An example of the coupling between a rectangular bus waveguide and a proximal rib waveguide is shown in FIG. 14. Rectangular dielectric waveguide 340 is connected to proximal rib waveguide 350 with transition 360.

Preferred embodiments of the coupler can be identified one at a time by testing the quality of the coupler by measuring, the transmission losses and the reflection coefficient (or voltage standing wave ratio). Among the other ways in which to seek embodiments having the attribute of quality, guidance toward the next preferred embodiment can be based on the presence of accurate phase shifting from a phase shifter connected to the coupler.

Fiber optic links between the light emitting diodes (LEDs) and the photosensitive elements of the phase shifters provide control of the phase shifters. Nonimaging couplers can be used to couple the optical fibers and LEDs, as shown in FIG. 15.

Figure 15:
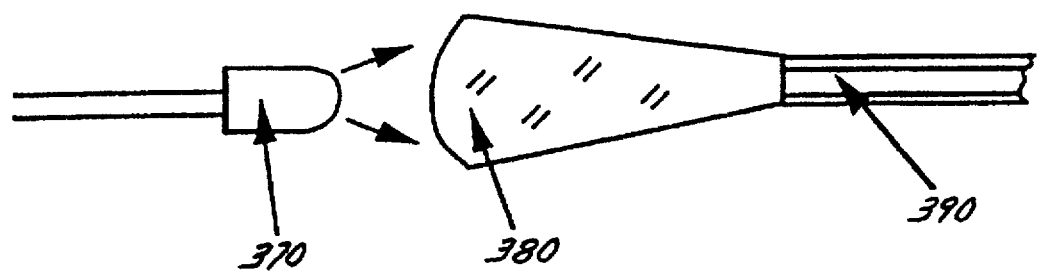
FIG. 15 illustrates a schematic view of a nonimaging coupler located between a light emitting diode (LED) and an optical fiber according to the present invention.

Referring to FIG. 15, an infrared electromagnetic signal from infrared emitting diode 370 travels toward non-imaging coupler 380. In the particular embodiment illustrated, the convex incident surface of non-imaging coupler 380 links with the light from infrared light emitting diode 370 and couples the light to optical fiber 390.

Figure 16:
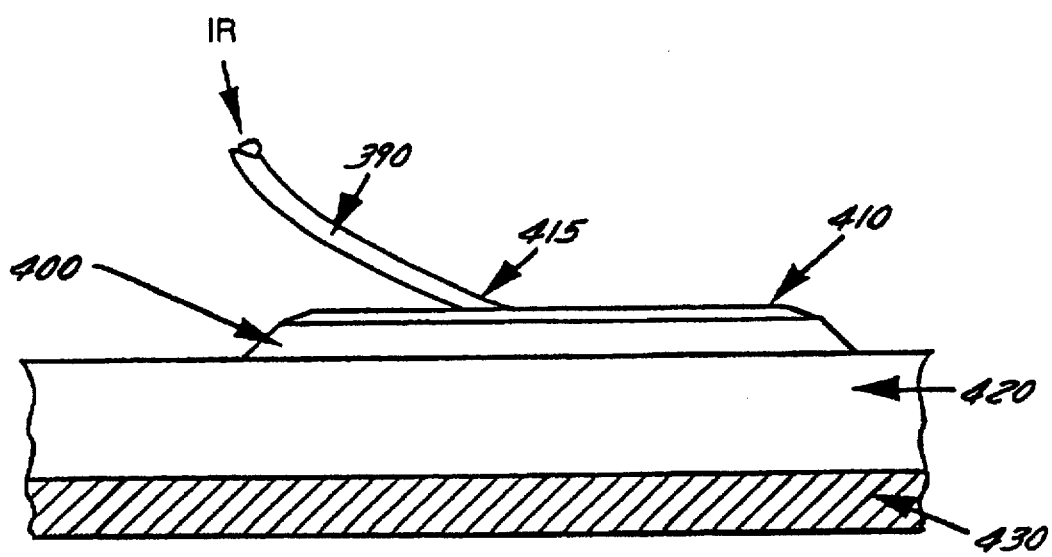
FIG. 16 illustrates a schematic cross sectional view of an indium tin oxide (ITO) film which prevents the coupling of MMW from the dielectric waveguide to the optical fiber according to the present invention.

Referring to FIG. 16, the other end of the optical fiber 390 can be tapered and glued to a silicon photosensitive element 400 using transparent epoxy 415. To prevent coupling of MMW from the silicon photosensitive element 400 to the optical fiber 390, the outer surface of the silicon photosensitive element 400 can be covered with an indium-tin oxide (ITO) film 410. ITO is transparent to IR and visible radiation but reflects MMW radiation. Silicon photosensitive element 400 is provided on branch waveguide 420. The portion of branch waveguide 420 that is illustrated can correspond to the approximate mid-point of plasma induced modulators comprising branch waveguide 420. Branch waveguide 420 is provided on substrate 430.

Figure 17A:
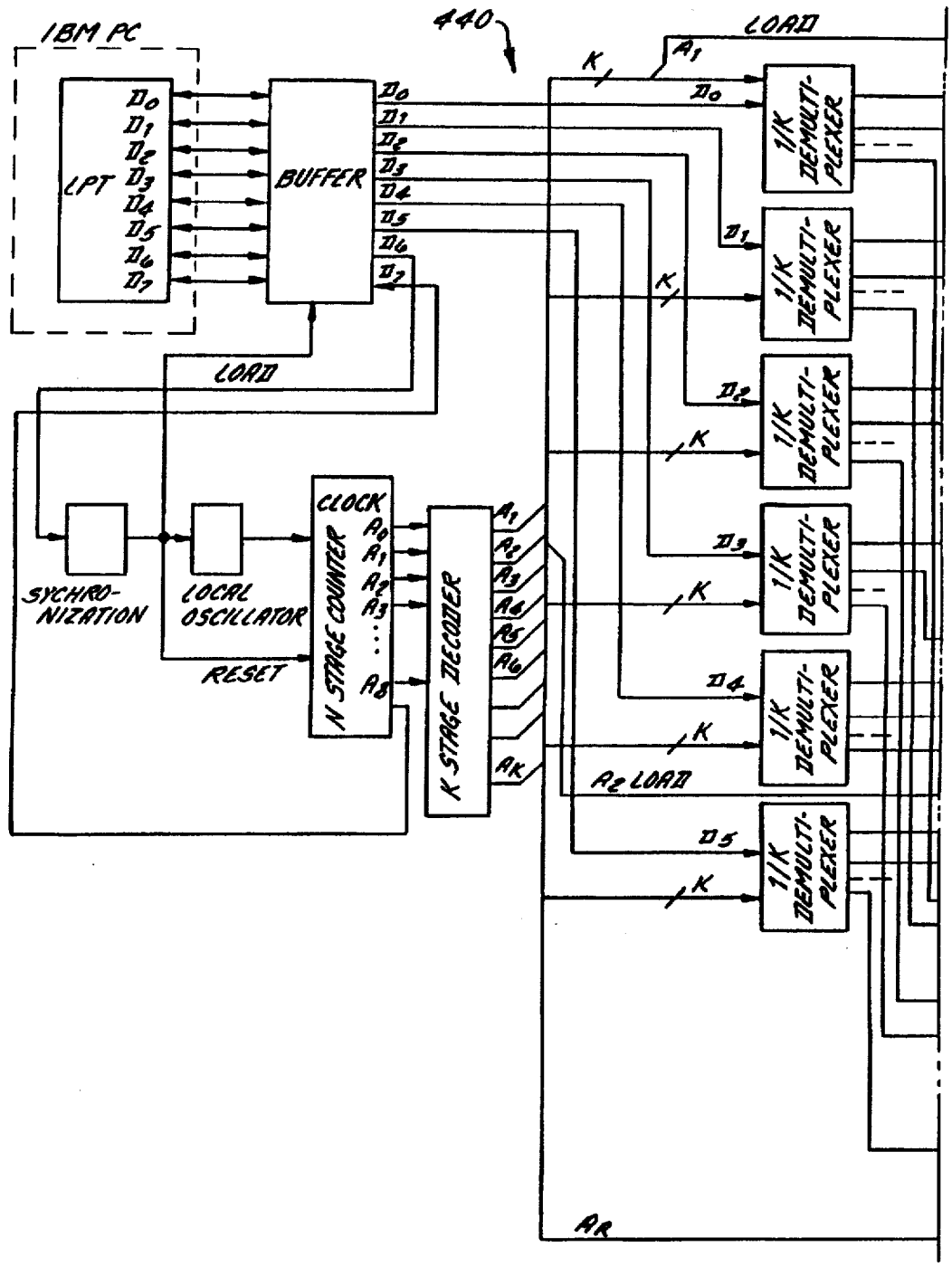
FIG. 17 illustrates a schematic view of an optical control driver according to the present invention.
Figure 17B:
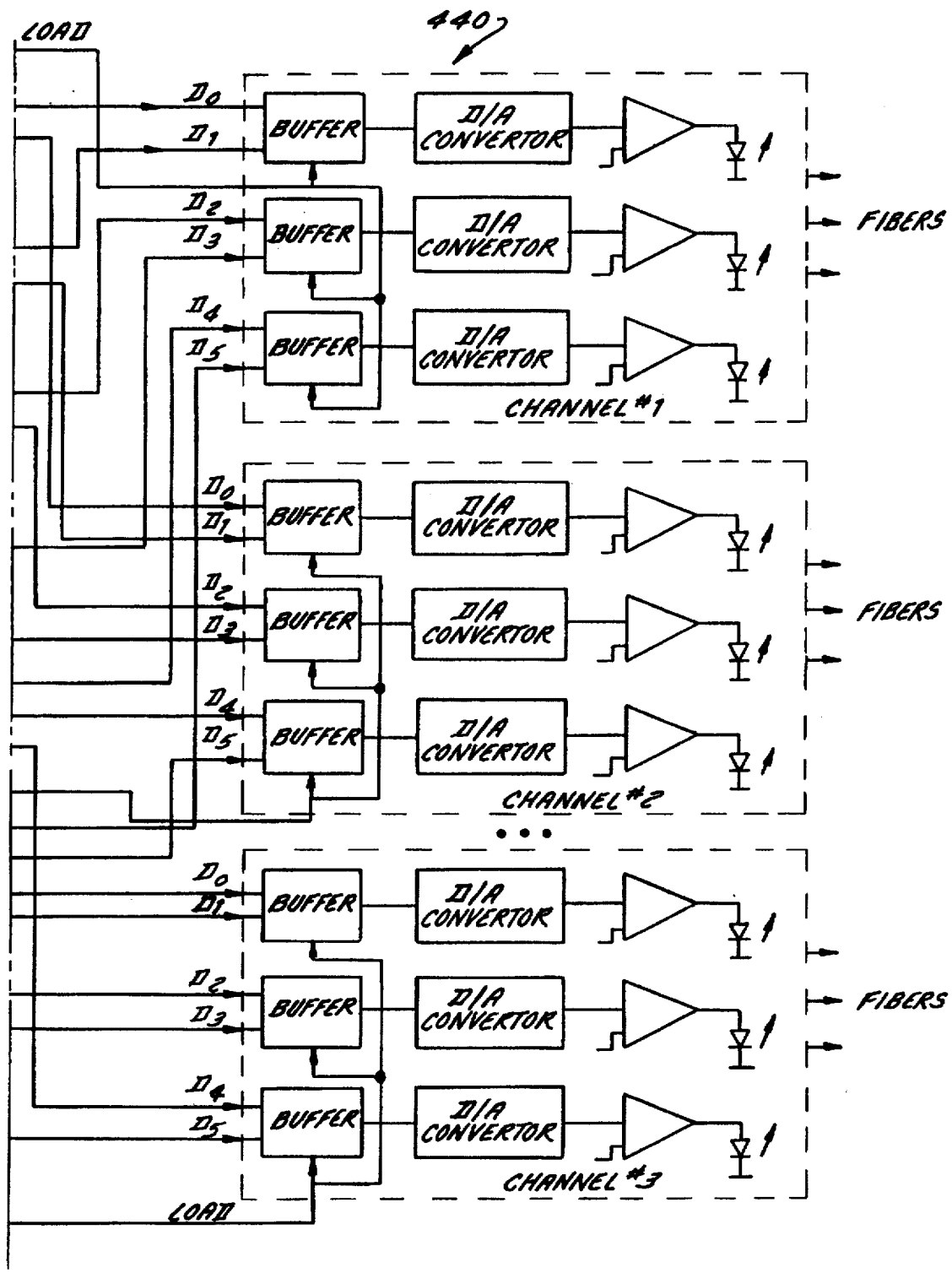

Referring to FIG. 17, an optical control driver 440 can generate an appropriate set of IR signals to feed the photosensitive elements of the phase shifters. A small scale example of phase shifters arranged to form an antenna would need (10×12)3=360 channels with 8 bits of information in each channel. The information will be generated in a computer and sent to the optical control driver in serial code. The optical control driver is an antenna subsystem which generates infrared (IR) control signals and governs their amplitudes to achieve the required beam shape and direction of radiation.

The optical control driver 440 can receive signals from a parallel (LPT) port of a personal computer, and then convert the serial code from the computer to a parallel code to feed the digital-to-analog convertors. The analog signals from the convertors are amplified, and feed the 360 LEDs that generate optical analog signals to feed the photosensitive elements of the phase shifters.

Figure 18:
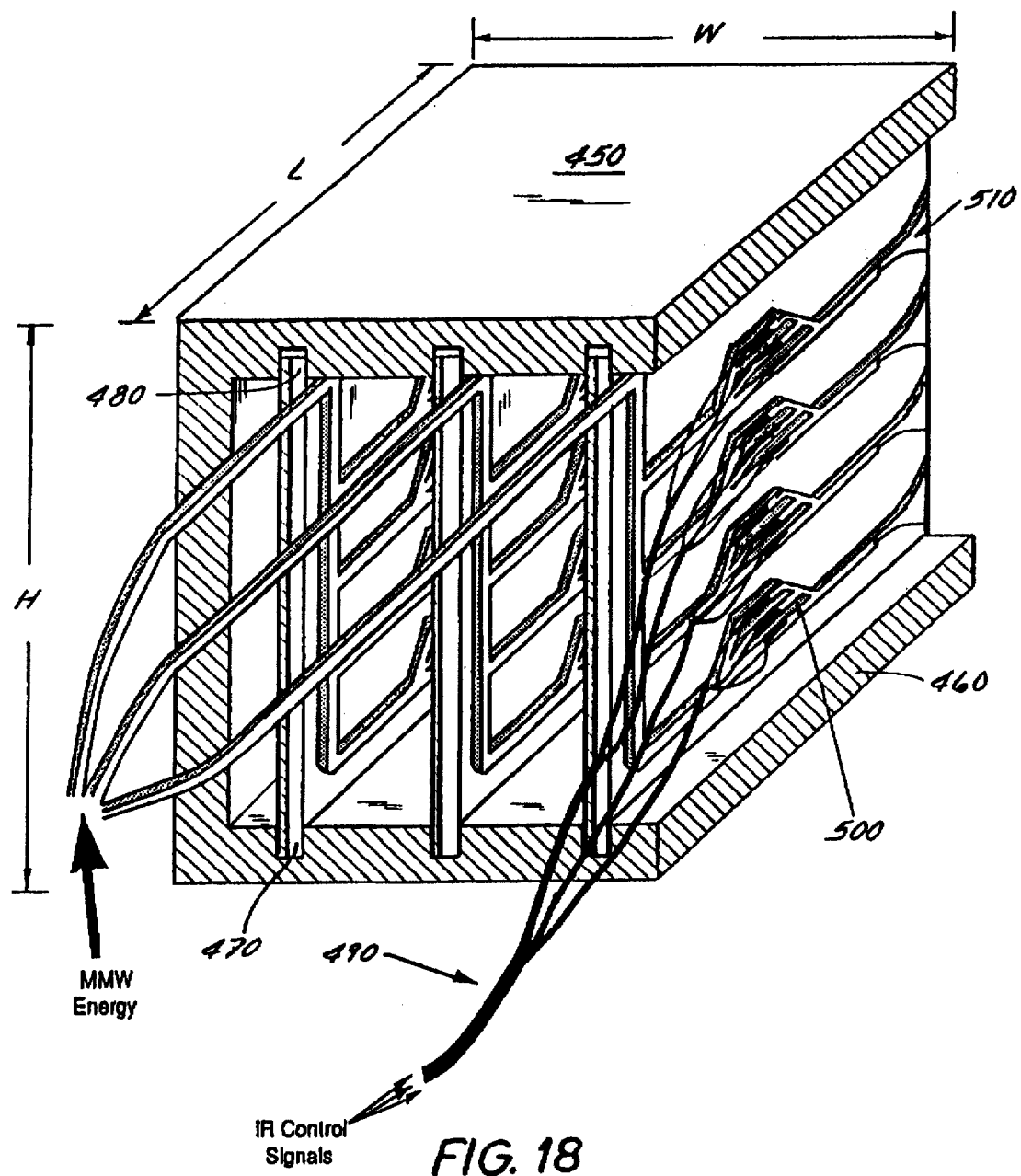
FIG. 18 illustrates a schematic isometric view of an antenna assembly packaging concept according to the present invention.

Referring to FIG. 18, a packaging configuration for the antenna phase-shifting and radiating elements is shown. Package 450 is an antenna array and includes a box 460 and ten boards 470 (seven of which are not shown) inserted into slots 480, allowing easy access to the phase shifters to exchange them, if necessary. Infrared control signals are conducted through fiber bundle 490. In this way, an appropriate set of control signals can be routed to phase shifters 500. Phase shifters 500 control the phase of the millimeter wavelength electromagnetic signals reaching receiving/transmitting elements 510.

The height of package 450 can be as small as from approximately 2" to approximately 3". The length of package 450 can be as small as from approximately 2" to approximately 4". The width of package 450 can be as small as from approximately 2" to approximately 3".

Figure 19:
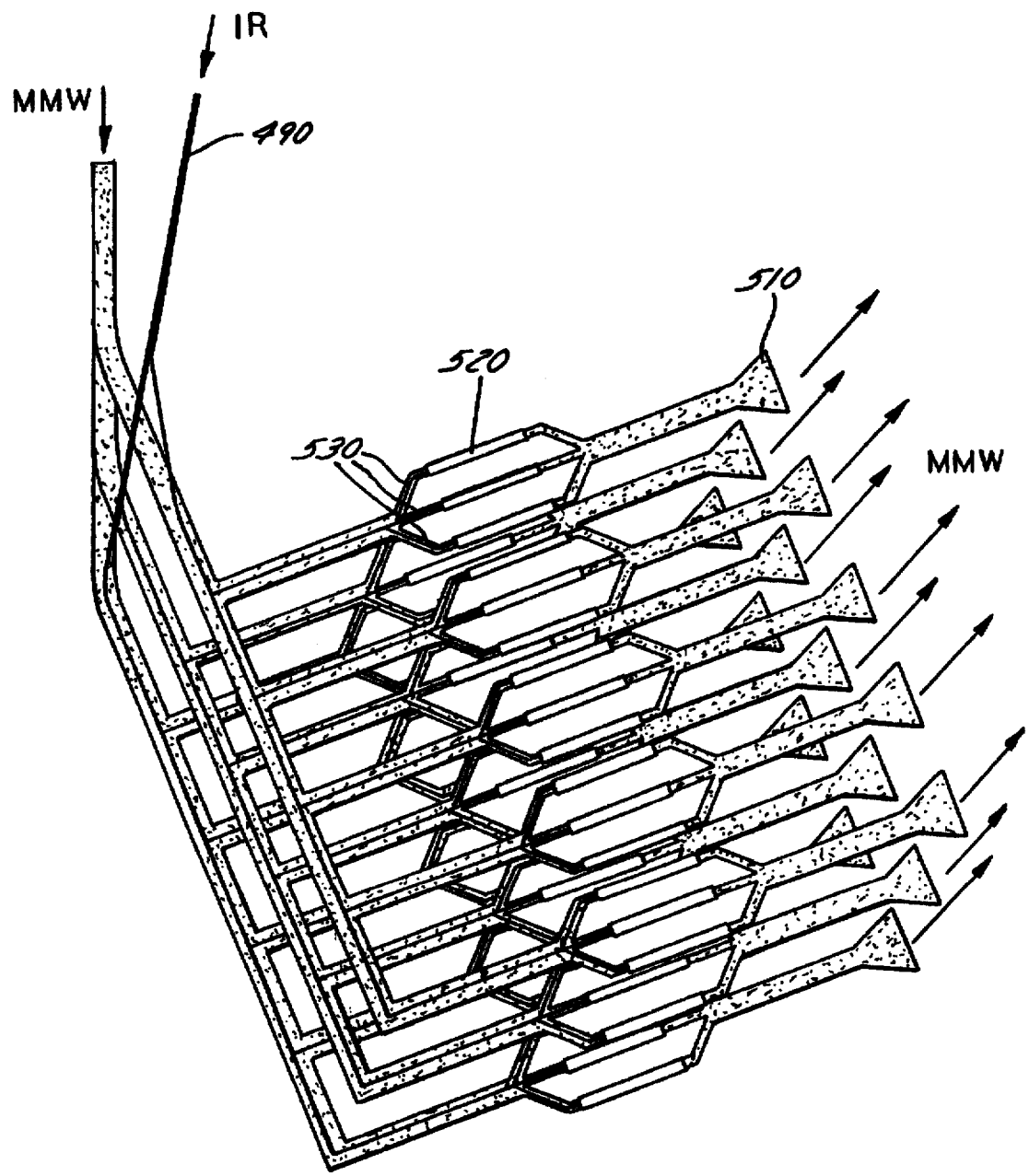
FIG. 19 illustrates a schematic isometric view of part of the antenna assembly packaging concept depicted in FIG. 18.

Referring to FIG. 19, the active components from the configuration shown in FIG. 18 can be more clearly seen. Elements 510 can be emitting and/or receiving elements. Three photosensitive semiconductive plasma injectors 520 are shown connected to three branch waveguides 530. Although the preferred embodiments shown in the figures are described with regard to MMW, it is within the level of ordinary skill in the art after having knowledge of the invention disclosed herein to realize and apply the invention to longer wavelengths, such as, for example, microwave.

It will be appreciated that when compared to microwave radar, MMW systems are physically much smaller and have better spatial resolution. Although MMW systems do not have the extreme resolution of higher frequency sensors operating in the IR or visible regions, MMW systems have superior propagation characteristics when operating through smoke, haze, dust and fog. Therefore, for many applications, MMW systems are an excellent solution, particularly where such MMW systems require scanning antennas.

There are several potential commercial applications for MMW systems that require scanning antennas. Two huge emerging markets are for automobile collision avoidance radars and aircraft landing systems.

Therefore, a practical application of the present invention which has value within the technological arts is anti-collision radars for automobiles. Most of the major auto manufacturers are working on systems that will aid in the prevention of accidents. Other auto applications include automatic speed control as a function of traffic and road conditions, and navigation.

Another practical application of the present invention which has value within the technological arts is aircraft collision avoidance and wire detection. Helicopters historically have had serious problems with power lines and telephone lines. Among other systems evaluated as a wire-detection system is MMW radar.

Another practical application of the present invention which has value within the technological arts is autonomous landing system. MMW radar is one of the sensors under evaluation to allow aircraft to land under difficult low-visibility conditions.

Another practical application of the present invention which has value within the technological arts is weather monitoring, sever weather warning, and wind-shear and microburst detection represent areas of current activity, particularly for airborne applications. MMW radar may also be useful for satellite-based precipitation and cloud-top monitoring.

Another practical application of the present invention which has value within the technological arts is industrial control and/or instrumentation. Remote sensing of industrial process under difficult environments using MMW radar is also receiving attention at this time.

Yet another practical application of the present invention which has value within the technological arts is concealed weapons detection. Remote scanning of crowds to locate persons carrying concealed weapons is possible using an MMW imaging radiometer. Such a device, operating at, for example, 94 GHz can detect weapons on a person, even under clothing.

Further, all the disclosed embodiments of the present invention are useful in conjunction with radars such as are used for the purpose of seeking, or for the purpose of tracking, or the like. Them are virtually innumerable uses for the present invention described herein, all of which need not be detailed here.

A method of operation an antenna that includes the optically controlled phase shifter can be as follows. A transmitter provides the radio frequency signal in sufficient strength (power) for the radar sensitivity desired and sends it to the antenna, which causes the signal to be radiated into space in a desired direction. The signal propagates (radiates) in space, and some of it is intercepted by reflecting bodies. These reflections, in part at least, are radiated back to the antenna. The antenna collects them and routes all such received signals to the receiver, where they are amplified and detected. The presence of an echo of the transmitted signal in the received signal reveals the presence of a target. The echo is indicated by a sudden rise in the output of the detector, which produces a voltage (e.g., video display) proportional to the sum of the radio frequency signals being received and the radio frequency noise inherent in the receiver itself. The time between the transmission and the receipt of the echo discloses the range to the target. The direction or bearing of the target is disclosed by the direction the antenna is pointing when an echo is received.

A duplexer permits the same antenna to be used on both transmit and receive, and is equipped with protective devices to block the very strong transmit signal from going to the sensitive receiver and damaging it. The antenna forms a beam, usually quite directive, and, in the search example, scans throughout the region to be searched.

The disclosed embodiments show TEFLON waveguides as the structure for performing the function of conducting MMW electromagnetic waves, but the structure for conducting MMW electromagnetic waves can be any other structure capable of performing the function of conducting MMW electromagnetic waves, including, by way of example, other polymers, or metals, or even ceramics.

However, the particular material selected for MMW conduction is not essential to the present invention, so long as it provides the described function. Normally, the manufacturers of this product will select the best commercially available material as a matter of design choice based upon the economics of cost and availability, in view of the expected application requirements of the final product and the demands of the overall manufacturing process.

EXAMPLE

A specific embodiment of the present invention will now be further described by the following, nonlimiting example which will serve to illustrate various features of significance. The example is intended merely to facilitate an understanding of ways in which the present invention may be practiced and to further enable those of skill in the art to practice the present invention. Accordingly, the example should not be construed as limiting the scope of the present invention.

As illustrated in Table I (set forth below), the appropriate subsystems can be assembled into a scanning antenna that has the following specifications.

TABLE I

| Antenna Parameters | |
|---|---|
| Frequency | 94 GHz |
| Beamwidth | 5° |
| Aperture | 1.5" × 1.5" |
| Number of Emitters | 120 |
| Energy per Emitter | 10 µJ |
| Energy per Position | 1 mJ |
| Number of Positions per Frame | 100 |
| Total Optical Power | 0.1 W |
| Total Electrical Power | 1 W |
| Volume | 1.5" × 1.5" × 4" |
| Gain | 32 dB |
| Azimuth Limits | −70° to 70° |
| Elevation Limits | −70° to 70° |

It can be seen from Table I that the effect of the phase shifter is to provide a MMW scanning antenna. Table I demonstrates substantially improved results that are unexpected. Specifically, the total optical power of 0.1 watt demonstrates the unexpected advantageous result that when the control coupling is changed to the mathematically "imaginary" part of the dielectric constant $\epsilon$ from the mathematically "real" part of the dielectric constant $\epsilon$, required optical power changes from prohibitively high to relatively low. Further, the resulting package size and cost is unexpectedly advantageously reduced.

The present invention described herein provides substantially improved results that are unexpected. The present invention described herein can be practiced without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, performance could be enhanced by providing additional amplifiers. Similarly, although TEFLON is preferred for the MMW waveguides, and quartz is preferred for the IR waveguide any suitably conductive materials can be used in their place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which interrelate so as to provide phase shifting. Further, although the three arm interferometer phase shifter and antennas are described herein as physically separate modules, it will be manifest that the three arm interferometer phase shifter and antennas may be integrated into the apparatus with which they are associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. Koul, S., "Microwave and Millimeter Wave Phase Shifters," Bharathi Bhat, editors, Anech House, Inc., v. 1 and 2, 1991.
2. Vaucher, A. M., Striffler, C. D., Lee, C. H., "Theory of Optically Controlled Millimeter Wave Phase Shifters," IEEE Trans. on Microwave Theory and Tech., v. MTT-31, pp. 209–216, 1983.
3. DeFouzo, A. P., Lee, C. H., Mak, P. S., "Optically Controllable Millimeter Wave Phase Shifter," Appl. Phys. Lett. v. 35(8), pp. 575–577, 1979.
4. Roug, A. S., Sun, Z. L., "Phase Shift and Loss Mechanism of Optically Excited E-Phase Electron-Hole Plasma," Proc. SPIE, v. 2104, pp. 543–544, 1993.
5. Butler, J. K., Wu, T. F., Scott, M. W., "Nonuniform Layer Model of a Millimeter-Wave Phase Shifter," IEEE Trans. on Microwave Theory and Techn., v. MTT-34, pp. 147–155, 1986.
6. Lee, C. H., Mak, P. S., DeFouzo, A. P., "Optical Control of Millimeter-Wave Propagation in Dielectric Waveguides," IEEE J. Quantum Electronics, v. QE-16, pp. 277–288, 1980.
7. Tsuji, H., Fujishiro, H. I., Shikata, M., Tanaka, K., Nishi, S., GaAs IC Symp. pp. 113–166, 1991, IEEE 1991.
8. Sharma, A. K., Ouak, G., Lai, R., Tan, K. L., "A High Power and High Efficiency Monolithic Power Amplifier at V-Band using Pseudomorphic HEMTs," 1994 MMIC Symposium.
9. Sharma. A. K., Ouak, G., Yamauchi, S. D. I., Goel, J., Lai, R., Tan, K. L., "Millimeter-Wave High Power Amplifiers using Pseudomorphic HEMTS," 1994 MTT Symposium.
10. Rosen, A., Amaneta, R., Stabile, P. J., Fathy, A. E., Gilbert, D. B., Bechtle, D. W., Tautou, W. M., McGinly, F. J., "Investigation of Active Antenna Arrays at 60 GHz," IEEE MTT, October 1995.
11. Stabile, P. J., Rosen, A., Gilbert, D. B., Duffy, M. T., Looney, G., "Optically Controlled Millimeter-Wave Dielectric Waveguides using Silicon-on-Sapphire Technology," CLEO'92, pp. 336–338.
12. Rosen, A., Stabile P. J., Herczfeld, P., Daryoush, A., Buffer, J. K., "Optically Controlled IMPATT Diodes and Subsystems," 1989 SBMO Int. Microw. Symp. Proc. v. 11, pp. 589–594 (1989).
13. Ackerman, E., S. Wanuga, K. Candeta, R. Scotti, W. MacDonald, and J. Gates, "A3 to 6 GHz Microwave/Photonic Transceiver for Phased-Array Interconnects," Microwave J., Vol. 35, April 1992, pp. 60–71.
14. Soref, R. A., "Silicon-Based Optical-Microwave Integrated Circuits," Microwave J., Vol. 35, No. 5, May 1992, pp. 230–236.
15. Paolella, A., "The Photoresponse of the GaAs Metal-Semiconductor Field Effect Transistor," Ph.D. thesis, Drexel University, June 1992.

16. Richard, M. A., P. C. Claspy, K. B. Bhasin, and M. Bendeli, "Optical Control of an 8-Element Ka-Band Phased Array Antenna Using a High Speed Optoelectronic Interconnect," Proc. IEEE Antennas and Propagation Symp. Dallas, Tex., 7 May 1990 (NASA Tech. Memo. 102550).

17. Koepf, G. A., "Optical Processor for Phased-Array Antenna Beamforming," Proc. SPIE, Vol. 477, May 1984, pp. 75–81.

18. Riza, N. A., "High Speed 2-D Phased Array Antenna Scanning Using Acousto-Optic" Proc. SPIE Vol. 1703, Orlando, Fla., 20–23 Apr 1992, pp. 460–468.

19. Soref, R. A., "Electro-Optical Beamforming Network for Phased Array Antennas" U.S. Pat. No. 4,739,334, 19 Apr. 1988.

20. Matsumoto, K., M. Iszutsu, and T. Suera, "Microwave Phase Shifter Using Optical Waveguide Structure," IEEE J. Lightwave Tech., Vol. 9, November 1991, pp. 1523–1527.

21. Hietala, V. M., G. A. Vawter, W. J. Meyer, and S. H. Kravits, "Phased-Array Antenna Contorl by a Monolithic Photonic Integrated Circuit," Proc. SPIE, Vol. 1476, 1991, pp. 170–175.

22. Sullivan, C. T., S. D. Mukherjee, M. K. Hibbs-Brenner, A. Gopinath, E. Kalweit, T. Marta, W. Goldber, and R. Walterson, "Switched Time Delay Elements based on AlGas/Gas Optical Waveguide Technology at 1.32 μm for Optically Controlled Phased Array Antennas," Proc. SPIE, Vol. 1703, April 1992.

23. Soref, R. A., and H. F. Taylor, "Semiconductive Guided-Wave Programmable Optical Delay Lines Uinsg Electro-optic Fabry-Perot Elements," U.S. Pat. No. 5,140,651, 18 Aug. 1992.

24. Soref, R. A., "Optical Dispersion Technique for Time-Delay Beamsteering" Applied Optics, Vol. 31, 10 Dec. 1992, pp. 7395–7397.

25. Scott, D. C., D. V. Plant, and H. R. Fetterman, "60 GHz Sources Using Optically Driven Heterojunction Bipolar Transistors," Applied Physics Lett., Vol. 61, 6 July 1992, pp. 1–3.

26. Desalles, A. A. A., "Optical Control of GaAs MESFETs," IEEE Trans. MTT, v. MTT-31, pp. 812–892 1983.

27. Gautier, J. L. Pasquet, D., Pouvil, P., "Optical Effects on the Static and Dynamic Characteristics of a GaAs MESFET," IEEE Trans. on MTT, v. MTT-33, pp. 819–822, 1985.

28. Mizuno, H., "Microwave Characteristics of an Optically Controlled GaAs MESFET," IEEE Trans. MTT, v. MTT-31, pp. 596–600, 1983.

29. Simons, R. N., Bhasin, K. B., "Analysis of Optically Controlled Microwave/Millimeter Wave Device Structure," IEEE Trans. MTT, v. MTT-34, pp. 1349–1355, 1986.

30. Herczfeld, P. R., et al., "Optical Phase and Gain Control of a GaAs MMIC Transit-Receive Module," 18th Eur. Microwave Conf. Digest, pp. 831–836, 1988.

31. Lee, C. H., "Optical Generation and Control of Microwaves and Millimeter Waves," IEEE Inc. Microwave Symp. Digest, pp. 811–814, 1987.

32. Hadjicostas, G., Scott, M. W., Butler, J. K., "Optically Controlled Millimeter Wave Phase Shifter in a Metallic Waveguide," IEEE Int. Microwave Symp. Digest, pp. 657–660, 1987.

33. Reedy, E. K., Cassaday, "Millimeter Radar: Current Assessment, Future Directions," SPIE v. CR54, pp. 243–273, 1994.

34. Joel R. Fried, Polymer Science and Technology, Prentice Hall PTR (1995).

35. Bahaa E. A. Saleh & Malvin C. Teich, Fundamentals of Photonics, John Wiley & Sons (1991).

36. Handbook of Optics, 2nd ed., Vols. I–II, McGraw Hill (Michael Bass et al. eds., 1995).

37. Van Nostrand's Scientific Encyclopedia, 8th ed., Van Nostrand Reinhold (Douglas M. Considine et al. eds., 1995).

38. Radar Handbook, 2nd ed., McGraw Hill (Merrill I. Skolnik ed., 1990).

What is claimed is:

1. An apparatus, comprising:
   a proximal rib waveguide;
   a phase shifter connected to said proximal rib waveguide, said phase shifter including:
      a first plasma induced modulator coquetted to said proximal rib waveguide, said first plasma induced modulator having a first transmission coefficient a and including:
         a first branch waveguide connected to said proximal rib waveguide; and
         a first photosensitive semiconductive plasma injector connected to said first branch waveguide;
      a second plasma induced modulator connected to said proximal rib waveguide, said second plasma induced modulator having a second transmission coefficient b and including:
         a second branch waveguide connected to said proximal rib waveguide; and
         a second photosensitive semiconductive plasma injector connected to said second branch waveguide; and
      a third plasma induced modulator connected to said proximal rib waveguide, said third plasma induced modulator having a third transmission coefficient c and including:
         a third branch waveguide connected to said proximal rib waveguide; and
         a third photosensitive semiconductive plasma injector connected to said third branch waveguide,
   wherein a, b and c are each $\leq 1$.

2. The apparatus of claim 1, further comprising:
   a first optical fiber connected to said first photosensitive semiconductive plasma injector with a first connector that includes a first layer of indium tin oxide;
   a second optical fiber connected to said second photosensitive semiconductive plasma injector with a second connector that includes a second layer of indium tin oxide;
   a third optical fiber connected to said third photosensitive semiconductive plasma injector with a third connector that includes a third layer of indium tin oxide; and
   a distal rib waveguide connected to said first branch waveguide, said second branch waveguide and said third branch waveguide,
   wherein said first photosensitive semiconductive plasma injector includes silicon, said second photosensitive semiconductive plasma injector includes silicon and said third photosensitive semiconductive plasma injector includes silicon.

3. The apparatus of claim 2, further comprising a first infrared light emitting diode connected to said first optical fiber with a first nonimaging coupler, a second infrared light emitting diode connected to said second optical fiber with a second nonimaging coupler and a third infrared light emitting diode connected to said third optical fiber with a third nonimaging coupler.

4. The apparatus of claim 1, wherein said first branch waveguide has a phase shift $\Delta\phi_1$ of approximately 0, said second branch waveguide has a phase shift $\Delta\phi_2$ of approximately $+2\pi/3\lambda$ and said third branch waveguide has a phase shift $\Delta\phi_3$ of approximately $-2\pi/3\lambda$, where $\lambda$ is the wavelength of a millimeter wave source.

5. The apparatus of claim 1, further comprising a pseudomorphic high electron mobility transistor amplifier connected to said proximal rib waveguide, wherein said proximal rib waveguide i) includes a dielectric waveguide that includes polytetrafluoroethylene and ii) is at least partially covered with a metal film.

6. A method of making the apparatus of claim 1, comprising:
   providing a substrate;
   forming said proximal rib waveguide on said substrate;
   forming said first branch waveguide on said substrate;
   forming said second branch waveguide on said substrate; and
   forming said third branch waveguide on said substrate.

7. A signal processing system, comprising at least two of the apparatus of claim 1.

8. A method, comprising utilizing the apparatus of claim 1.

9. An apparatus, comprising:
   a first phased array including a first bus waveguide and a first plurality of phase shifters, each of said first plurality of phase shifters i) being connected to said first bus waveguide with a proximal rib wave guide and ii) including,
   a first plasma induced modulator connected to said proximal rib waveguide, said first plasma induced modulator having a first transmission coefficient a and including:
      a first branch waveguide connected to said proximal rib waveguide; and
      a first photosensitive semiconductive plasma injector connected to said first branch waveguide;
   a second plasma induced modulator connected to said proximal rib waveguide, said second plasma induced modulator having a second transmission coefficient b and including:
      a second branch waveguide connected to said proximal rib waveguide; and
      a second photosensitive semiconductive plasma injector connected to said second branch waveguide; and
   a third plasma induced modulator connected to said proximal rib waveguide, said third plasma induced modulator having a third transmission coefficient c and including:
      a third branch waveguide connected to said proximal rib waveguide; and
      a third photosensitive semiconductive plasma injector connected to said third branch waveguide,
   wherein a, b and c are each $\leq 1$.

10. The apparatus of claim 9, further comprising a second phased array connected to said first phased array with a trunk waveguide,
   wherein said first phased array includes a first end feed array and said second phased array includes a second end feed array.

11. The apparatus of claim 10, wherein said first bus waveguide includes a circular dielectric waveguide, said second phased array includes a bus waveguide having a second circular dielectric waveguide, said second phased array is connected to said first phased array in parallel, said first phased array includes a first pseudomorphic high electron mobility transistor amplifier and said second phased array includes a second pseudomorphic high electron mobility transistor amplifier.

12. The apparatus of claim 9, further comprising a second phased array connected to said first phased array with a trunk waveguide,
   wherein said first phased array includes a first series phase shifter array and said second phased array includes a second series phase shifter array.

13. The apparatus of claim 12, wherein said second phased array is connected to said first phased array in parallel, said first phased array includes a first pseudomorphic high electron mobility transistor amplifier and said second phased array includes a second pseudomorphic high electron mobility transistor amplifier.

14. The apparatus of claim 9, further comprising a second phased array connected to said first phased array with a trunk waveguide,
   wherein said first phased array includes a first center feed array and said second phased array includes a second center feed array.

15. The apparatus of claim 14, wherein said second phased array is connected to said first phased array in parallel, said first phased array includes a first pseudomorphic high electron mobility transistor amplifier and said second phased array includes a second pseudomorphic high electron mobility transistor amplifier.

16. The apparatus of claim 9, further comprising a second phased array connected to said first phased array with a trunk waveguide,
   wherein said first phased array includes a first equal path length feed array and said second phased array includes a second equal path length feed array.

17. The apparatus of claim 16, wherein said second phased array is connected to said first phased array in parallel, said first phased array includes a first pseudomorphic high electron mobility transistor amplifier and said second phased array includes a second pseudomorphic high electron mobility transistor amplifier.

18. A method of making the apparatus of claim 9, comprising:
   providing a substrate;
   forming said first bus waveguide on said substrate; and
   forming said first branch waveguide, said second branch waveguide and said third branch waveguide of each of said first plurality of phase shifters on said substrate.

19. A signal processing system, comprising at least two of the apparatus of claim 9.

20. A method, comprising utilizing the apparatus of claim 9.

21. A method, comprising:
   providing a proximal rib waveguide;
   providing a phase shifter connected to said proximal rib waveguide, said phase shifter including:
      a first plasma induced modulator connected to said proximal rib waveguide, said first plasma induced modulator having a first transmission coefficient a, where $a \leq 1$, and including:
         a first branch waveguide connected to said proximal rib waveguide; and
         a first photosensitive semiconductive plasma injector connected to said first branch waveguide;
      a second plasma induced modulator connected to said proximal rib waveguide, said second plasma induced modulator having a second transmission coefficient b, where b≦1, and including:
  a second branch waveguide connected to said proximal rib waveguide; and
  a second photosensitive semiconductive plasma injector connected to said second branch waveguide; and
a third plasma induced modulator connected to said proximal rib waveguide, said third plasma induced modulator having a third transmission coefficient c, where c≦1, and including:
  a third branch waveguide connected to said proximal rib waveguide; and
  a third photosensitive semiconductive plasma injector connected to said third branch waveguide;
applying an electromagnetic signal to said proximal rib waveguide;
applying a first infrared signal to said first photosensitive semiconductive plasma injector through a first optical fiber;
applying a second infrared signal to said second photosensitive semiconductive plasma injector through a second optical fiber; and
applying a third infrared signal to said third photosensitive semiconductive plasma injector through a third optical fiber.

22. The method of claim 21, wherein said electromagnetic signal includes a millimeter wave signal and an output signal amplitude $I_{out}$ from said phase shifter varies as a function of an input signal amplitude $I_o$ to said proximal rib waveguide according to a relationship $$I_{out}(a,b,c) = aI_o/3 + (bI_o/3)\exp(2\pi i/3) + (cI_o/3)\exp(-2\pi i/3),$$

where $aI_o/3$ represents a first branch signal amplitude, $(bI_o/3)\exp(2\pi i/3)$ represents a second branch signal amplitude and $(cI_o/3)\exp(-2\pi i/3)$ represents a third branch signal amplitude.

23. The method of claim 22, wherein said output signal amplitude $I_{out}$ from said phase shifter varies as a function of said input signal amplitude $I_o$ to said proximal rib waveguide according to a relationship $$I_{out} = (2(3^{1/2})^{-1} I_o)\exp(i\phi_{out}),$$

where $\phi_{out}$ represents an output signal phase shift.

24. A method, comprising:
providing a proximal rib waveguide;
providing a phase shifter connected to said proximal rib waveguide, said phase shifter including:
  a first plasma induced modulator connected to said proximal rib waveguide, said first plasma induced modulator having a first transmission coefficient a, where a≦1, and including:
    a first branch waveguide connected to said proximal rib waveguide; and
    a first photosensitive semiconductive plasma injector connected to said first branch waveguide;
  a second plasma induced modulator connected to said proximal rib waveguide, said second plasma induced modulator having a second transmission coefficient b, where b≦1, and including:
    a second branch waveguide connected to said proximal rib waveguide; and
    a second photosensitive semiconductive plasma injector connected to said second branch waveguide; and
  a third plasma induced modulator connected to said proximal rib waveguide, said third plasma induced modulator having a third transmission coefficient c, where c≦1, and including:
    a third branch waveguide connected to said proximal rib waveguide; and
    a third photosensitive semiconductive plasma injector connected to said third branch waveguide;
collecting an electromagnetic signal from said proximal rib waveguide;
applying a first infrared signal to said first photosensitive semiconductive plasma injector through a first optical fiber;
applying a second infrared signal to said second photosensitive semiconductive plasma injector through a second optical fiber; and
applying a third infrared signal to said third photosensitive semiconductive plasma injector through a third optical fiber.

* * * * *

UNITED STATES PATENT AND TRADEMARK OFFICE
CERTIFICATE OF CORRECTION

PATENT NO. : 5,694,498
DATED : December 2, 1997
INVENTOR(S) : Manasson et al.

It is certified that error appears in the above-identified patent and that said Letters Patent is hereby corrected as shown below:

Col. 2, line 51, delete "three arm" and insert --three-arm--.
Col. 3, line 10, delete "an" and insert --a--.
Col. 3, line 11, delete "is to".
Col. 3, line 13, delete "is".
Col. 3, line 15, delete "which is".
Col. 3, line 20, delete "sad" and insert --said--.
Col. 3, line 61, delete "three arm" and insert --three-arm--.
Col. 4, line 7, after "plurality" delete " , ".
Col. 7, line 51, after "$\phi$" insert a space.
Col. 8, line 5, delete "shire" and insert --shift--.
Col. 8, line 14, delete "3" and insert --three--.
Col. 8, line 19, delete "3" and insert --three--.

UNITED STATES PATENT AND TRADEMARK OFFICE
CERTIFICATE OF CORRECTION

PATENT NO. : 5,694,498
DATED : December 2, 1997
INVENTOR(S) : Manasson et al

It is certified that error appears in the above-identified patent and that said Letters Patent is hereby corrected as shown below:

Col. 8, line 49, delete "LED's" and insert --Light Emitting Diodes (LEDs)--.
Col. 8, line 51, delete "LED's" and insert --LEDs--.
Col. 9, line 8, after "wavelength" insert --(MMW)--.
Col. 9, line 24, after "g" insert --is--.
Col. 9, line 25, after "g'" insert -- , --.
Col. 12, line 8, delete "sever" and insert --severe--.
Col. 12, line 28, delete "Them" and insert --There--.
Col. 14, line 2, delete "three arm" and insert --three-arm--.
Col. 16, line 17, delete "coquetted" and insert --connected--.

Signed and Sealed this

Eighteenth Day of July, 2000

*Attest:*

Q. TODD DICKINSON

*Attesting Officer*     *Director of Patents and Trademarks*